UNITED STATES PATENT OFFICE.

HENRY STALAY ARTHUR HOLT AND GERHARD STEIMMIG, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCING SUBSTANCES RESEMBLING CAOUTCHOUC.

1,294,662.   Specification of Letters Patent.   Patented Feb. 18, 1919.

No Drawing.   Application filed August 22, 1912. Serial No. 716,442.

*To all whom it may concern:*

Be it known that we, HENRY STALAY ARTHUR HOLT and GERHARD STEIMMIG, subjects, respectively, of the King of England and of the King of Prussia, residing at Ludwigshafen-on-the-Rhine, Germany, have invented new and useful Improvements in Producing Substances Resembling Caoutchouc, of which the following is a specification.

We have found that the polymerization of 1.3-butadiene and of other hydrocarbons of the same homologous series, such for instance as isoprene, 1-methyl-1.3-butadiene and 2.3-dimethyl-1.3-butadiene, can be considerably accelerated and the yield of caoutchouc considerably increased if the butadiene or other hydrocarbon be polymerized in the presence of small quantities, that is to say about 3% of an organic substance containing oxygen in a loosely combined state. Under this term applicants wish to have understood organic substances such as peroxids, superoxids, ozonids and the like. The substance may be capable either of itself giving up oxygen or of acting as a carrier of oxygen. As instances of such substances we mention oxidized caoutchouc (either natural or synthetic, and either vulcanized or not), which can be prepared, for instance, by treating caoutchouc with oxygen or ozone, also butadiene or a member of the same homologous series which has been treated with ozone or other suitable oxidizing agent, an oxidized but undecomposed terpene containing at least ten carbon atoms in the molecule, and further benzoyl superoxid, but our invention is not limited to the use of these substances. The products obtainable according to our invention are characterized by being insoluble in benzene, and only swelling when placed therein, and they thus differ from the products obtained according to Heinemann's British Patent No. 14,041 A. D. 1910.

In this application we make no claim specifically to the production of substances resembling caoutchouc by polymerizing a hydrocarbon of the butadiene series in the presence of an oxidized hydro-carbon of the butadiene series, since specific claims for this process are contained in our divisional application, Serial No. 791,938 filed September 26th, 1913 on which the Patent No. 1,189,110 has been granted.

It is found that the use of an organic substance soluble in the butadiene series and containing oxygen in a loosely combined state is an advantage for the reason that such soluble organic ozonids and the like exert a better action since they are uniformly distributed through the butadiene hydrocarbon. The oxygen of the organic substance is evolved from the dissolved state; that is, in the most intimate distribution and most complete contact conceivable with the butadiene hydrocarbons and the result is the polymerizing is carried forward to a higher degree and a substance insoluble in benzene is obtained.

The following examples will serve to illustrate the nature of our invention, but the invention is not limited to these examples.

*Example 1.*

Add to isoprene two per cent. of its weight of old oxidized caoutchouc and polymerize by heating for a considerable time at 100° C.

*Example 2.*

Mix isoprene with three per cent. of oxidized caoutchouc (prepared by treating caoutchouc with ozone) and polymerize by maintaining the mixture for a considerable time at a raised temperature, for instance at from 60° to 100° C.

*Example 3.*

Mix 100 parts by weight of isoprene with from 2 to 3 parts by weight of the product obtainable by acting on a terpene hydrocarbon with ozone, and then polymerize by heating for a considerable time at 100° C.

*Example 4.*

Mix 100 parts by weight of 2.3-dimethyl-1.3-butadiene with 3 parts by weight of 2.3-dimethyl-1.3-butadiene ozonid (obtainable from 2.3-dimethyl-1.3-butadiene and ozone) and polymerize by heating at 100° C.

In this example, instead of 2.3-dimethyl-1.2-butadiene ozonid, isoprene ozonid may be employed.

In a similar manner, the polymerization of 1.3-butadiene can be effected.

Now what we claim is:—

1. The process of producing substances resembling caoutchouc and being insoluble in benzene by polymerizing a hydrocarbon of the butadiene series in the presence of about three per cent. of an organic substance soluble in the butadiene hydrocarbon containing oxygen in a loosely combined state.

2. The process of producing substances resembling caoutchouc and being insoluble in benzene by polymerizing a hydrocarbon of the butadiene series in the presence of about three per cent. of an oxidized but undecomposed terpene, containing at least ten carbon atoms in the molecule.

3. The process of producing substances resembling caoutchouc and being insoluble in benzene by polymerizing a hydrocarbon of the butadiene series in the presence of about three per cent. of an organic substance consisting of an ozonid containing oxygen in a loosely combined state and active chemically, said organic substance being soluble in said hydrocarbon and capable of mixing intimately with the hydrocarbon and reaching every part of it.

In testimony whereof we have hereunto set our hands in the presence of two subscribing witnesses.

ARTHUR HOLT.
GERHARD STEIMMIG.

Witnesses:
  ERNEST C. EHRHARDT,
  JOSEPH PEIFFER.